(12) United States Patent
Chang et al.

(10) Patent No.: US 8,217,902 B2
(45) Date of Patent: Jul. 10, 2012

(54) CONDUCTOR PATTERN STRUCTURE OF CAPACITIVE TOUCH PANEL

(75) Inventors: Ching-Yang Chang, Taipei (TW); Shun-Ta Chien, Taipei (TW)

(73) Assignee: TPK Touch Solutions Inc., Da-An District, Taipei (TW)

( * ) Notice: Subject to any disclaimer, the term of this patent is extended or adjusted under 35 U.S.C. 154(b) by 939 days.

(21) Appl. No.: 11/842,747

(22) Filed: Aug. 21, 2007

(65) Prior Publication Data

US 2008/0264699 A1 Oct. 30, 2008

(30) Foreign Application Priority Data

Apr. 27, 2007 (TW) ............................... 96115152 A

(51) Int. Cl.
*G06F 3/041* (2006.01)
*G09G 5/00* (2006.01)
*G01R 27/26* (2006.01)

(52) U.S. Cl. ..................... 345/173; 345/156; 324/661

(58) Field of Classification Search .......... 345/173–184; 178/18.01–18.08; 341/33–34
See application file for complete search history.

(56) References Cited

U.S. PATENT DOCUMENTS

| | | | |
|---|---|---|---|
| 4,550,221 A | 10/1985 | Mabusth | |
| 5,381,160 A | 1/1995 | Landmeier | |
| 6,005,555 A | 12/1999 | Katsurahira et al. | |
| 6,137,427 A | 10/2000 | Binstead | |
| 6,188,391 B1 * | 2/2001 | Seely et al. | 345/173 |
| 6,970,160 B2 | 11/2005 | Mulligan et al. | |
| 7,030,860 B1 * | 4/2006 | Hsu et al. | 345/173 |
| 7,292,229 B2 | 11/2007 | Morag et al. | |
| 2004/0119701 A1 * | 6/2004 | Mulligan et al. | 345/173 |
| 2005/0030048 A1 * | 2/2005 | Bolender et al. | 324/661 |
| 2006/0066581 A1 | 3/2006 | Lyon et al. | |
| 2009/0160682 A1 | 6/2009 | Bolender | |

FOREIGN PATENT DOCUMENTS

JP 60-075927 4/1985

OTHER PUBLICATIONS

Korean Office Action; issue date, May 18, 2009 for SN 10-2007-0133201.
EP Office Action dated Jan. 1, 2009; SN 07018556.6.
U.S. Appl. No. 10/279,828.
A Communication from the European Patent Office dated Sep. 16, 2008 regarding the corresponding foreign patent application EP07018556.

* cited by examiner

*Primary Examiner* — Alexander S Beck
*Assistant Examiner* — Charles V Hicks
(74) *Attorney, Agent, or Firm* — Orrick Herrington & Sutcliffe, LLP

(57) ABSTRACT

Disclosed is a conductor pattern structure of a capacitive touch panel. First-axis conductor assemblies and second-axis conductor assemblies are formed on a surface of a substrate. Each first-axis conductor assembly includes a plurality of first-axis conductor cells that are interconnected by first-axis conduction lines. An insulation layer is formed on a surface of each first-axis conduction line. Each second-axis conductor assembly includes a plurality of second-axis conductor cells that are interconnected by second-axis conduction lines. Each second-axis conduction line extends across the insulation layer of the associated first-axis conduction line.

68 Claims, 5 Drawing Sheets

CONDUCTOR PATTERN STRUCTURE OF CAPACITIVE TOUCH PANEL

FIELD OF THE INVENTION

The present invention relates to the field of touch panel devices, and in particular to a conductor pattern structure of a capacitive touch panel.

BACKGROUND OF THE INVENTION

Touch panels have been of wide applications in the fields of household appliances, communications, and electronic information appliances. An example of the common applications of the touch panel is an input interface of a personal digital assistant (PDA), an electrical appliance, or a game machine, etc. The current trend of integration of a touch panel and a display panel allows a user to use his or her finger or a stylus to point a control icon shown on the panel in order to execute a desired function on a PDA, an electrical appliance or a game machine, etc. The touch panel is also applied in a public information inquiry system to provide an efficient operation system for the public.

A conventional touch panel comprises a substrate having a surface on which sensing zones are distributed for sensing a signal associated with the touch of a user's finger or stylus to effect input and control. The sensing zones are made of transparent conductive membranes, such as Indium Tin Oxide (ITO), whereby a user may touch the transparent conducive membrane corresponding to a specific location shown on the display to effect operation of the device.

The most commonly known types of touch panels include resistive panel, capacitive panel, infrared sensing panel, electromagnetic sensing panel, and sonic sensing panel. The capacitive touch panel employs a change in capacitance caused between a transparent electrode and the electrostatics of human body to induce an current based on which the touch location can be identified. The capacitive touch panel is advantageous in light transparency, hardness, precision, response time, touch cycles, operation temperature, and initiation force and is thus most commonly used currently.

In order to detect the location where a finger or a stylus touches the touch panel, a variety of capacitive touch panel techniques are developed. An example is U.S. Pat. No. 6,970,160, which discloses a lattice touch-sensing system for detecting a position of a touch on a touch-sensitive surface. The lattice touch-sensing system may include two capacitive sensing layers, separated by an insulating material, where each layer consists of substantially parallel conducting elements, and the conducting elements of the two sensing layers are substantially orthogonal to each other. Each element may comprise a series of diamond shaped patches that are connected together with narrow conductive rectangular strips. Each conducting element of a given sensing layer is electrically connected at one or both ends to a lead line of a corresponding set of lead lines. A control circuit may also be included to provide an excitation signal to both sets of conducting elements through the corresponding sets of lead lines, to receive sensing signals generated by sensor elements when a touch on the surface occurs, and to determine a position of the touch based on the position of the affected bars in each layer.

U.S. Pat. No. 4,233,522 discloses a capacitive touch panel comprising an array of touch sensitive switch cells. Each switch cell includes a first and a second pair of series connected capacitors energized by a common signal source, the array of switch cells being arranged so that the first pair of capacitors are connected in first groups of switch cells, such as rows, to a corresponding first plurality of signal detectors, and the second pair of capacitors are connected in second groups of switch cells, such as columns, to a corresponding second plurality of signal detectors, the junctions of each pair of capacitors of a single switch cell being selectively coupled to ground by the body or other touch capacitive means for actuating a selected switch cell.

U.S. Pat. No. 4,733,222 discloses a capacitance variation sensitive touch sensing array system including an array of electrodes, an array of drive lines, a drive signal generator, and an array of sense lines. Each electrode is a connected series of conductive tabs and forms either a row or a column of the electrode array. Each drive line is capacitively coupled to a plurality of the electrodes. The drive signal generator generates and applies alternating signal packets to the drive lines. The sense line is capacitively coupled to a plurality of the electrodes so that signals are derived from the electrodes when drive signals are applied to the drive lines. The number of electrodes is equal to the product of the number of drive lines and the number of sense lines. Based on values derived from signals on the sense lines, a microprocessor provides information associated with touch by an operator.

U.S. Pat. No. 5,880,411 discloses a method for recognizing a position made by a conductive object on a touch-sensor pad. Signals are sent to a control circuit of a host to identify the touch position. U.S. Pat. Nos. 6,414,671 and 5,374,787 disclose the same technique.

U.S. Pat. No. 7,030,860 discloses a transparent, capacitive sensing system particularly well suited for input to electronic devices. The capacitive sensor can further be used as an input device for a graphical user interface, especially if overlaid on top of a display device like an LCD screen to sense finger position and contact area over the display.

U.S. Pat. No. 5,459,463 discloses a device for locating an object situated close to a detection area and a transparent keyboard incorporating the device. The device comprises a first set of detection zones connected so as to form lines which extend parallel to each other and to a detection area, a second set of detection zones connected to each other so as to form columns which extend perpendicularly to the lines, a scanning device which applies an electric signal to the lines and columns, and means for determining the position of an object by means of the scanning device.

U.S. Pat. No. 6,498,590 discloses a multi-user touch system including a surface on which antennas are formed. A transmitter transmits uniquely identifiable signals to each antenna. Receivers are capacitively coupled to different users, and the receivers are configured to receive the uniquely identifiable signals. A processor then associates a specific antenna with a particular user when multiple users simultaneously touch any of the antennas.

U.S. Pat. No. 5,847,690 discloses a unitary display and sensing device, which integrates liquid crystal display module elements of a liquid crystal display module for detecting input on a flat panel display screen.

All the prior art references described above provide teaching of detection touch of a user on a touch panel and all are comprised of structures of touch sensing elements. However, these known devices are all of a construction including two capacitive sensing layers spaced from each other with an insulation material to effect capacitive effect between the layers. This makes the structure of the panel very thick and is thus against the trend of miniaturization. Further, the conventional capacitive touch panel comprises a substrate on both surfaces of which two capacitive sensing layers are formed respectively. In this respect, through holes must be formed on the substrate to serve as vias and circuit layering must be adopted to properly connect conductor elements of the sensing layers. This complicates the manufacturing of the capacitive touch panel.

Thus, it is desired to have a capacitive touch panel that overcomes the above drawbacks of the conventional capacitive touch panels.

SUMMARY OF THE INVENTION

Thus, an objective of the present invention is to provide a capacitive touch panel comprising a thin conductor pattern structure, which consists of a plurality of first-axis conductor assemblies and a plurality of second-axis conductor assemblies, each conductor assembly being comprised of a plurality of conductor cells interconnected by conduction lines, wherein the conduction lines extending in different axes are isolated from each other by an insulation layer.

Another objective of the present invention is to provide a capacitive touch panel comprising a conductor pattern structure consisting of first-axis conductor assemblies and second-axis conductor assemblies, both comprising conductors cells connected by conduction lines, the conductor cells and the conduction lines being formed on the same surface of a substrate by known processes for manufacturing general transparent conductor layer, whereby when a user touches the surface of the touch panel, the first-axis conductor assemblies and the second-axis conductor assemblies that are touched by the user induce capacitive effect between adjacent conductor cells thereof.

According to the present invention, a solution to overcome the above discussed drawbacks of the conventional capacitive touch panels resides in that a conductor pattern structure is formed on a surface of a substrate, comprising a plurality of first-axis conductor assemblies and a plurality of second-axis conductor assemblies that are extended in directions that are substantially perpendicular to each other and that comprise a plurality of equally-spaced first-axis conductor cells and equally-spaced second-axis conductor cells respectively, and first-axis conduction lines and second-axis conduction lines interconnecting the first-axis conductors along the first axis and the second-axis conductors along the second axis respectively, wherein an insulation layer is provided to cover a surface of each first-axis conduction line to isolate the first-axis conduction line from the associated second-axis conduction line.

According to the present invention, a plurality of first-axis conductor assemblies and a plurality of second-axis conductor assemblies, which constitute the conductor pattern structure of a capacitive touch panel, are formed on the same surface of a substrate, thereby simplifying the structure and reducing the thickness of the structure. When the conductor cells of the first-axis conductor assemblies and the conductor cells of the second-axis conductor assemblies that are adjacent to each other are touched by a user's finger, a capacitance variation signal is induced, in response to the area of the adjacent conductor cells on which the finger of the user is laid, and then applied to a control circuit to identify the position where the user's finger touches the panel. The first-axis conductor assemblies and the second-axis conductor assemblies of the conductor pattern structure can be formed on only one surface of the substrate by the general circuit laying techniques. Thus, the present invention can be practiced in a simple process with high passing rate and low costs.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION

Figure 1:
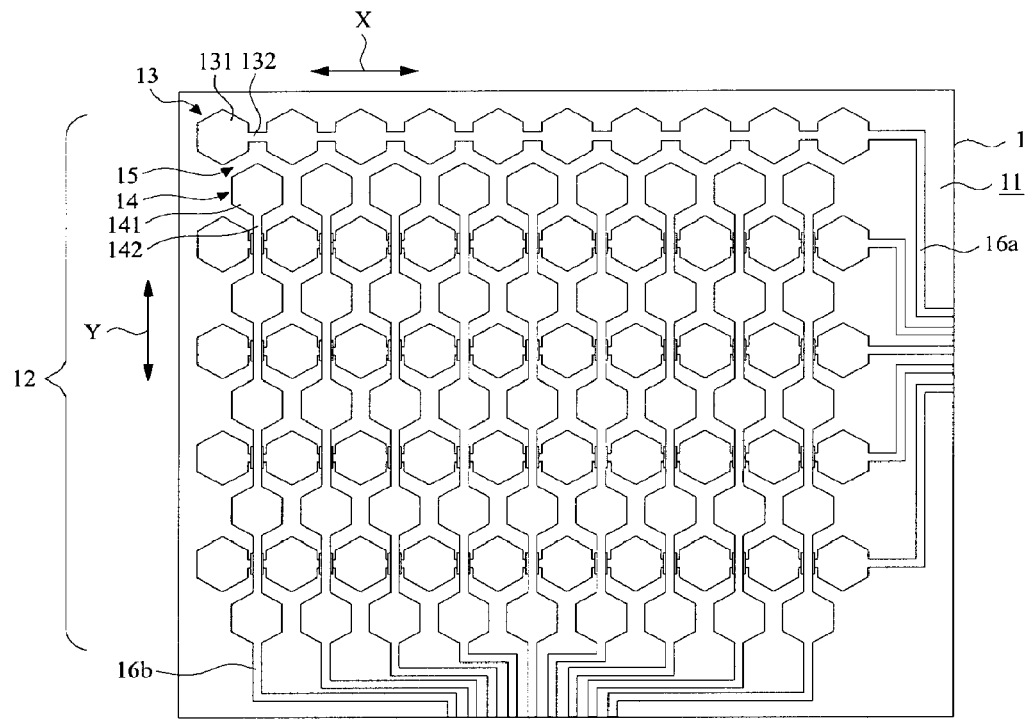
FIG. 1 is a plan view of a conductor pattern structure of a capacitive touch panel in accordance with a first embodiment of the present invention.
Figure 2:
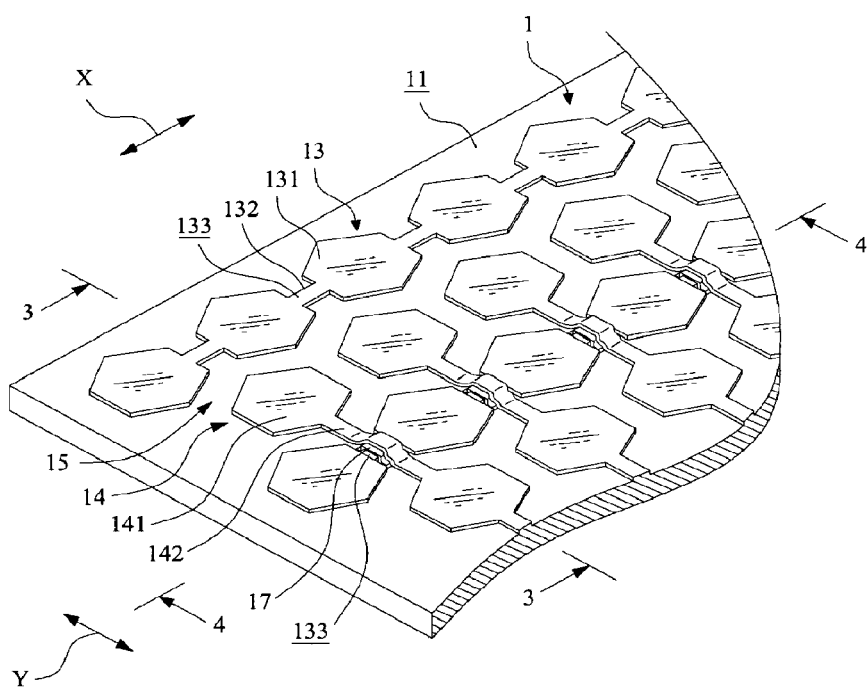
FIG. 2 is a perspective view of a portion of the conductor pattern structure of the capacitive touch panel of the present invention.

With reference to the drawings and in particular to FIGS. 1 and 2, of which FIG. 1 illustrates a plan view of a conductor pattern structure of a capacitive touch panel in accordance with a first embodiment of the present invention and FIG. 2 illustrates a perspective view of a portion of the conductor pattern structure of the capacitive touch panel, generally designated with reference numeral 12, is formed on a surface 11 of a substrate 1. The conductor pattern structure 12 comprises a plurality of conductor assemblies 13 extending along a first axis, which will be referred to as "first-axis conductor assemblies", and a plurality of conductor assemblies 14 extending along a second axis, which will be referred to as "second-axis conductor assemblies". Each of the first-axis conductor assemblies 13 is parallel to other first-axis conductor assemblies 13, and each of the second-axis conductor assemblies 14 is parallel to other second-axis conductor assemblies 14. The first-axis conductor assemblies 13 are substantially perpendicular to the second-axis conductor assemblies 14. However, it is apparent that the first-axis conductor assemblies 13 and the second-axis conductor assemblies 14 can be arranged on the surface 11 of the substrate 1 at an included angle therebetween that is other than a right angle.

Each first-axis conductor assembly 13 is composed of a plurality of first-axis conductor cells 131 that are lined up along the first axis, which is designated at "X" in the drawings, on the surface 11 of the substrate 1 in a substantially equally-spaced manner and a disposition zone 15 is delimited between adjacent first-axis conductor assemblies 13 and adjacent first-axis conductor cells 131.

A first-axis conduction line 132 connects between adjacent first-axis conductor cells 131 positioned along the first axis X so that the first-axis conductor cells 131 along the first axis X are electrically connected together to form a first-axis conductor assembly 13. In other words, the first-axis conductor cells 131 of the same first-axis conductor assembly 13 are connected together in cascade by the first-axis conduction lines 132. Each first-axis conductor assembly 13 is further connected to a signal transmission line 16a for transmitting a signal to a control circuit laid on a circuit board (both not shown).

Each of the conduction lines 132 has a surface 133 that is covered by an insulation covering layer 17, which is made of a material featuring electric insulation, and preferably a transparent insulation material, such as silicon dioxide. Each second-axis conductor assembly 14 is composed of a plurality of second-axis conductor cells 141 that are lined up along the second axis, which is designated at "Y" in the drawings, in a substantially equally-spaced manner on the surface 11 of the substrate 1. Each second-axis conductor cell 141 is set in the respective second-axis conductor cell disposition zone 15.

A second-axis conduction line 142 connects between adjacent second-axis conductor cells 141 positioned along the second axis Y and extends over and across a surface of each insulation layer 17 so that the second-axis conductor cells 141 of the same second-axis conductor assembly 14 are connected together. In other words, the second-axis conductor cells 141 of the same second-axis conductor assembly 14 are connected together in cascade by the second-axis conduction lines 142. Each second-axis conductor assembly 14 is further connected to a signal transmission line 16b for transmitting a signal to the control circuit.

Figure 3:
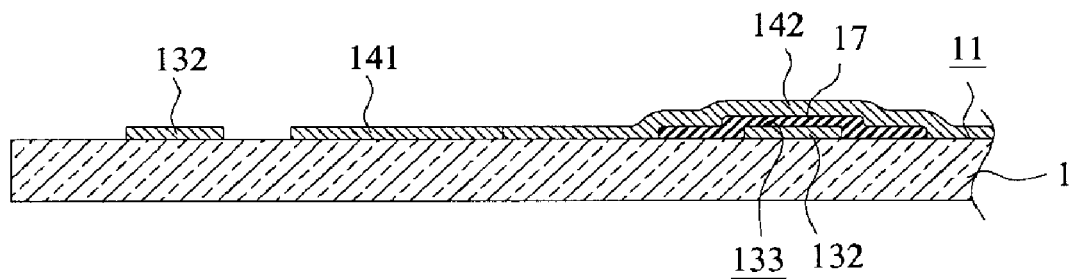
FIG. 3 is a cross-sectional view taken along line 3-3 of FIG. 2.
Figure 4:
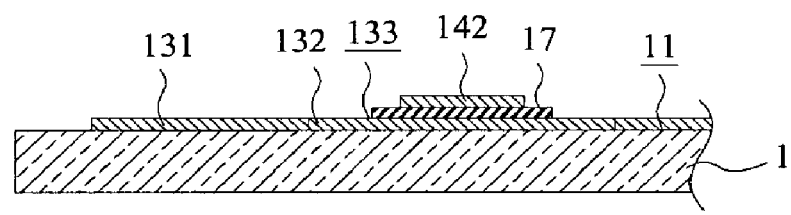
FIG. 4 is a cross-sectional view taken along line 4-4 of FIG. 2.

Also referring to FIG. 3, which shows a cross-sectional view taken along line 3-3 of FIG. 2, and FIG. 4, which shows a cross-sectional view taken along line 4-4 of FIG. 2, the first-axis conductor cells 131, the first-axis conduction lines 132, the second-axis conductor cells 141, and the second conduction lines 142 are made of transparent conductive material. The insulation layer 17 is interposed between the respective first-axis conduction line 132 and the second-axis conduction line 142 so that the second-axis conduction line 142 that connects adjacent second-axis conductor cells 141 of the second-axis conductor assembly 14 extends across the respectively first-axis conduction line 132 in a mutually-insulated manner.

The substrate 1 can be a glass substrate, and the first-axis conductor assemblies 13 and the second-axis conductor assemblies 14, and the first-axis and second-axis conduction lines 132, 142 are made of transparent conductive film, such as ITO conductive film. In the embodiment illustrated, the first-axis conductor cells 131 and the second-axis conductor cells 141 are of a shape of substantially hexagon geometry contour. It is apparent that the conductor cells 131, 141 can be of shapes of other geometry contours to effect an optimum distribution of effective conductor surface.

Figure 5:
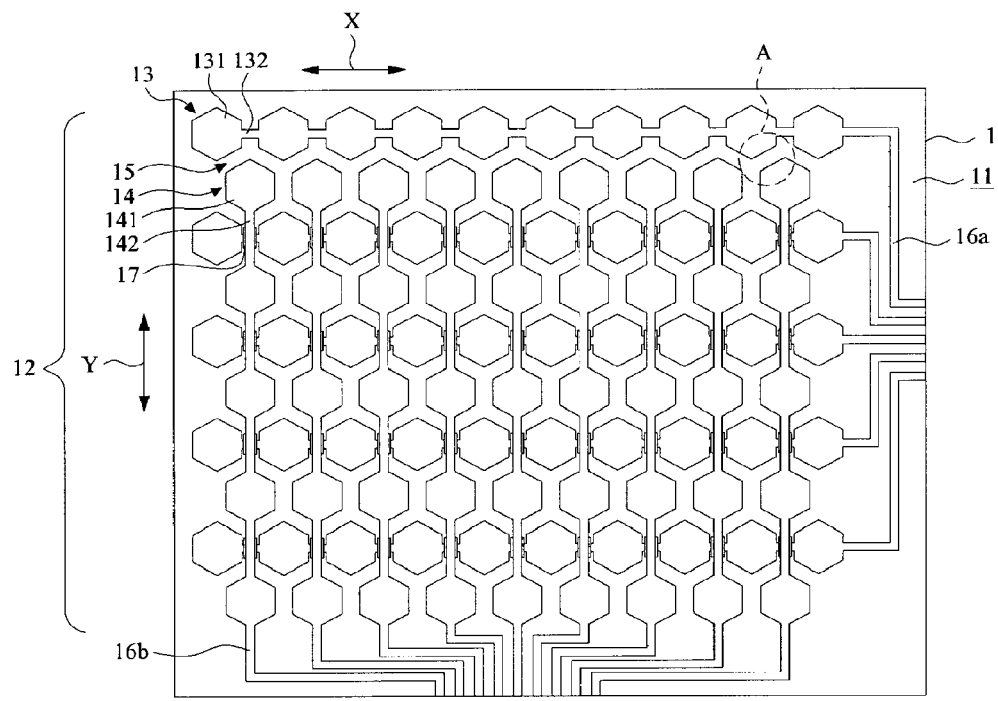
FIG. 5 illustrates a user's finger physically engaging a point on the capacitive touch panel in accordance with the present invention.
Figure 6:
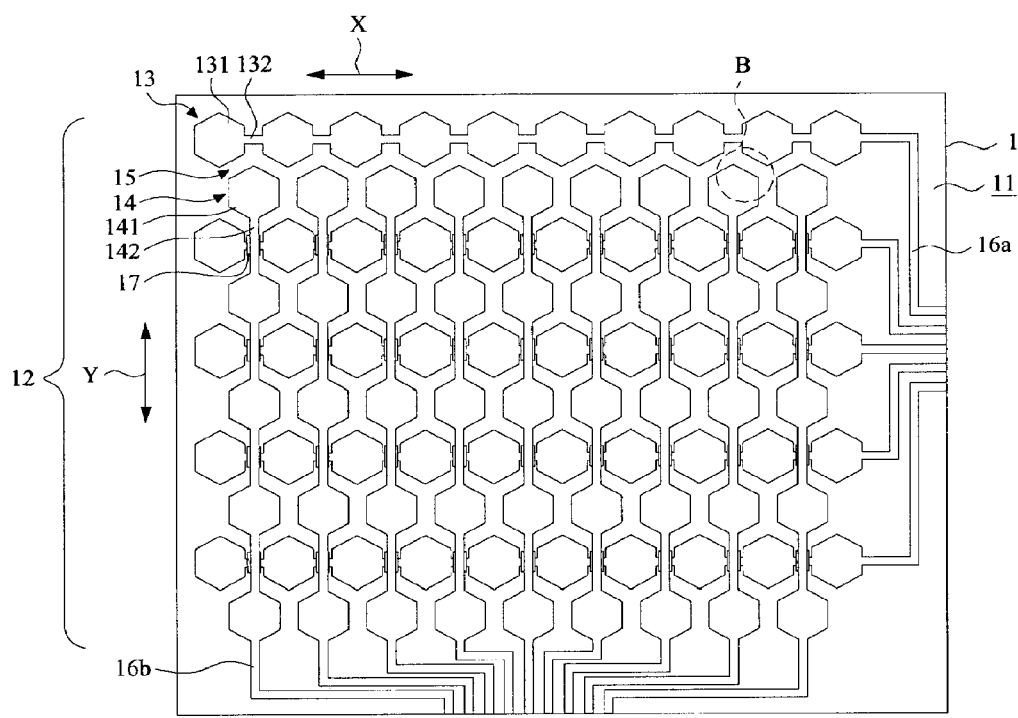
FIG. 6 illustrates the user's finger engaging a different point on the capacitive touch panel of the present invention.

FIG. 5 demonstrates a user's finger physically engaging a point on the capacitive touch panel in accordance with the present invention, and FIG. 6 demonstrates the user's finger engaging a different point on the capacitive touch panel of the present invention. When a user put his or her finger to touch a contact area (point), designated at "A", on the capacitive touch panel of the present invention, the first-axis conductor cell 131 of the first-axis conductor assembly 13 and the second-axis conductor cell 141 of the second-axis conductor assembly 14, which are covered by the contact area A, induce a capacitor effect therebetween and a signal caused thereby is transmitted through the signal transmission lines 16a, 16b to the control circuit. The control circuit may then carry out computation to determine on which point on the surface 11 of the substrate 1 the contact area A is set.

When the user moves his or her finger to another contact area B, the first-axis conductor cell 131 of the first-axis conductor assembly 13 and the second-axis conductor cell 141 of the second-axis conductor assembly 14, which are covered by the contact area B, induce a capacitor effect therebetween and a change occurs, which induces a signal that is transmitted through the signal transmission lines 16a, 16b to the control circuit. The control circuit may then carry out computation to determine on which point on the surface 11 of the substrate 1 the contact area B is set.

Figure 7:
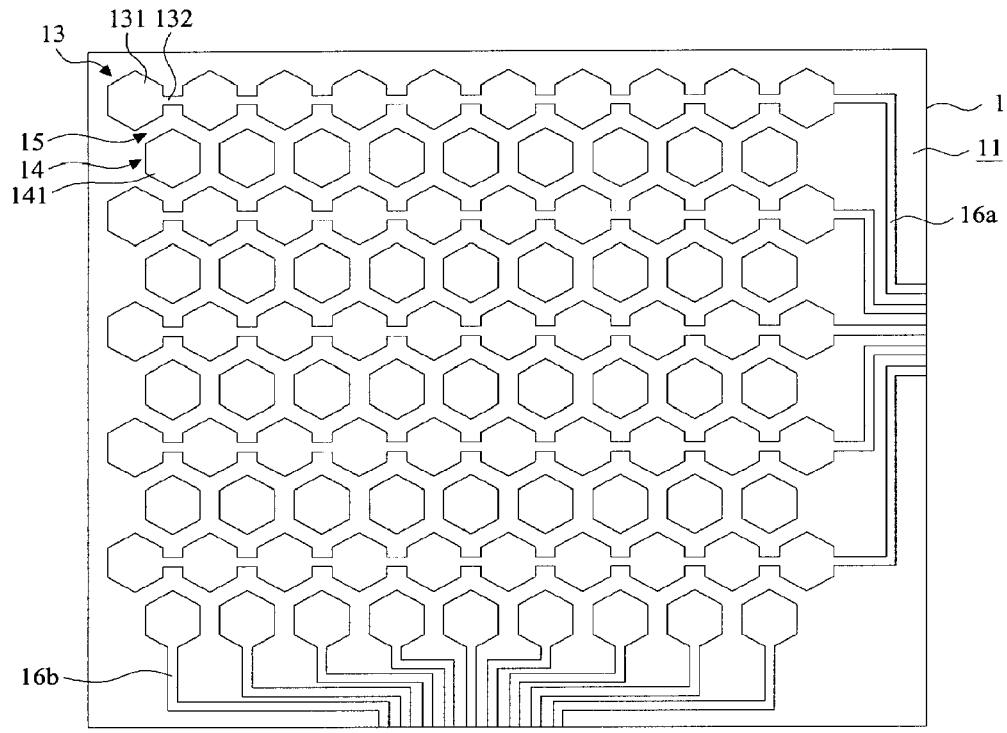
FIG. 7 illustrates a schematic view of a surface of a substrate on which a plurality of first-axis conductor cells, first-axis conduction lines, signal transmission lines, and second-axis conductor cells are formed.
Figure 8:
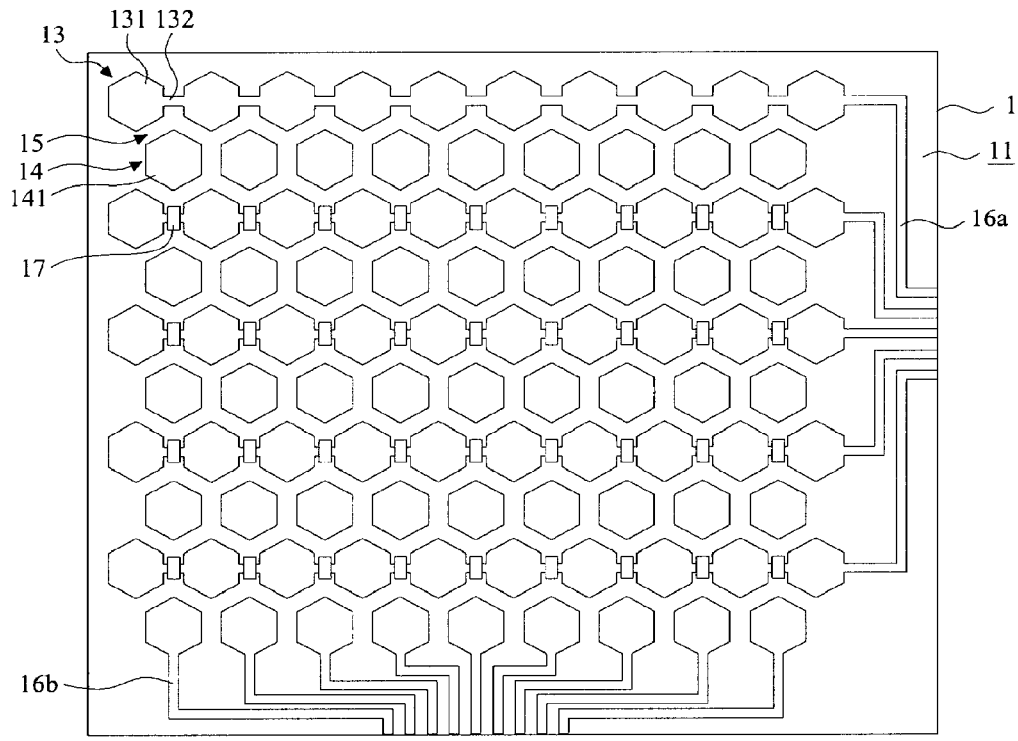
FIG. 8 illustrates a schematic view of the substrate surface on which an insulation layer is formed to cover the surface of each first-axis conduction line, after the step of FIG. 7.
Figure 9:
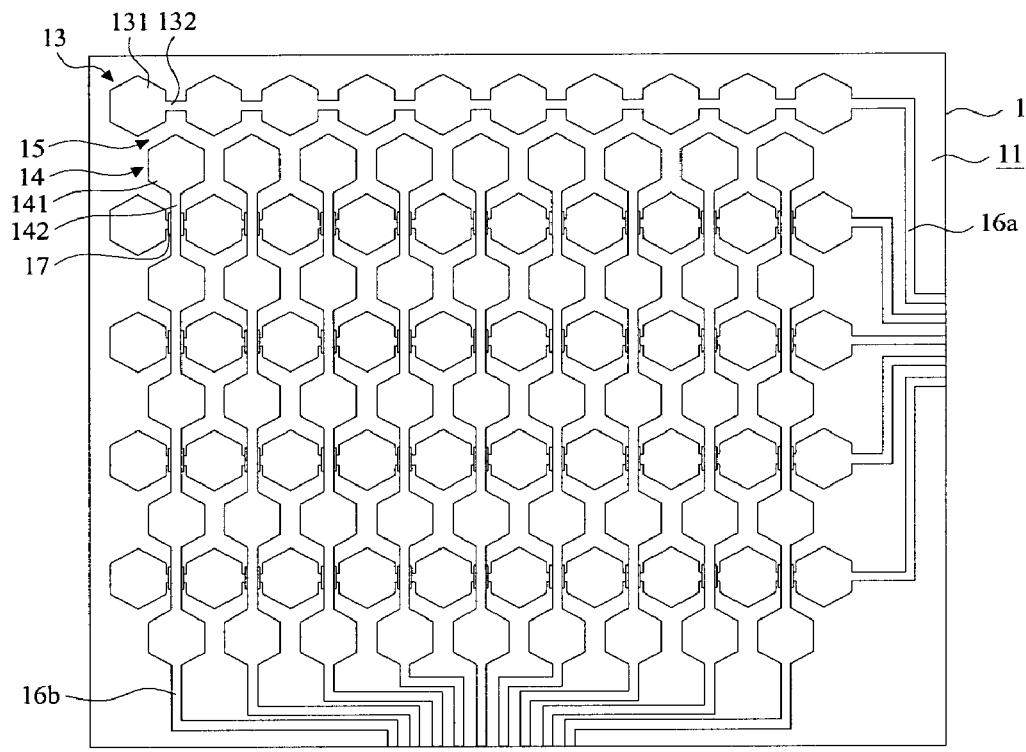
FIG. 9 illustrates a schematic view of the substrate surface on which a second-axis conduction line is formed to connect between each pair of adjacent second-axis conductor cells of the same second-axis conductor assembly, after the step of FIG. 8.

FIGS. 7 and 8 are schematic plan views demonstrating manufacturing steps of the conductor pattern of the capacitive touch panel in accordance with the present invention, wherein FIG. 7 illustrates the schematic view of a surface of a substrate on which a plurality of first-axis conductor cells 131, first-axis conduction lines 132, signal transmission lines 16a, 16b, and second-axis conductor cells 141 are just formed, and FIG. 8 illustrates the schematic view of the substrate surface on which an insulation covering layer 17 is formed to cover the surface of each first-axis conduction line 132, after the step of FIG. 7. Further, FIG. 9 illustrates a schematic view of the substrate surface on which a second-axis conduction line 142 is formed to connect between each pair of adjacent second-axis conductor cells 141 of the same second-axis conductor assembly, after the step of FIG. 8, to thereby complete the manufacturing of the conductor pattern structure of the touch panel in accordance with the present invention.

The manufacturing of the conductor pattern structure 12 can be carried out with any known techniques, such as etching, sputtering, and screen printing. Etching is taken as an example for manufacture of the conductor pattern structure as follows. First of all, a conductor film, of which an ITO transparent conductive film is an example, is formed on the surface 11 of a cleaned substrate 1. Thereafter, screen printing is employed to carry out etching mask printing process.

After the etching mask printing process, etching is carried out on the surface 11, followed by film stripping. Thus, the first-axis conductor cells 131 of the first-axis conductor assemblies 13, the first conduction lines 132, and the second-axis conductor cells 141 of the second-axis conductor assemblies 14, all being transparent and electrically conductive, are formed on the substrate surface 11, as shown in FIG. 7. At this point, all the first-axis conductor cells 131 of the same first-axis conductor assemblies 13 are electrically connected together and the first-axis conductor assemblies 13 are further connected to a plurality of signal transmission lines 16a.

Thereafter, an insulation covering layer 17 is applied to cover the surface 133 of each first-axis conduction line 132, as shown in FIG. 8. Then, a mask is formed with the printing technique to define the positions of the second-axis conduction lines 142, followed by application of a transparent conductive layer to form the second-axis conduction lines 142 whereby the adjacent second-axis conductor cells 141 along the second axis Y are each connected by the second-axis conduction lines 142 with each second-axis conduction line 142 extending over and across the surface of the respective insulation layer 17, as shown in FIG. 9. Once the step is done, all second-axis conductor cells 141 of the same second-axis conductor assemblies 14 are electrically connected together and the second-axis conductor assemblies 14 are connected to the signal transmission lines 16b.

When the etching technique described above is taken to form the conductor cells and the conduction lines on the substrate surface, different pattern can be formed with etching areas defined by different etching masks to similarly form a conductor pattern structure. For example, in the first etching step, only the first-axis conductor cells 131 and the first-axis conduction lines 132 of the first-axis conductor assemblies 13 are formed on the substrate surface 11, but not the second-axis conductor cells 141 of the second-axis conductor assemblies 14. Thereafter, the same etching technique is taken again to form the second-axis conductor cells 141 and the second-axis conduction lines 142 on the substrate surface 11, with the second conduction lines 142 extending over and across the surfaces of the associated insulation layers 17.

Figure 10:
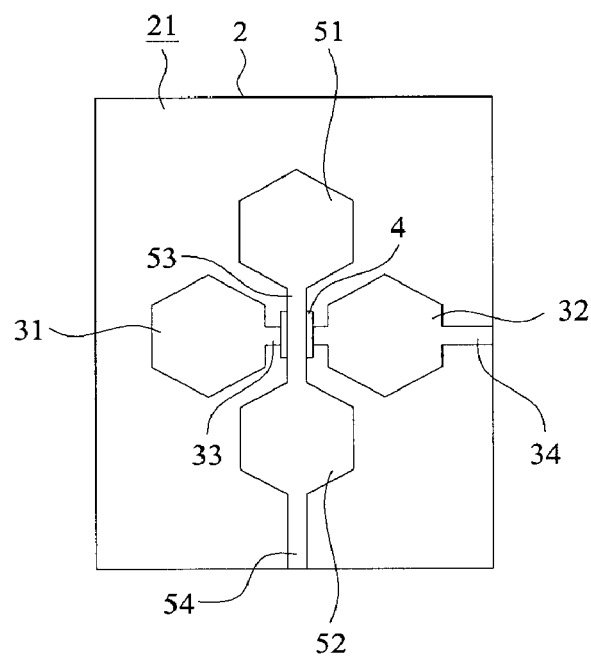
FIG. 10 is a plan view of a conductor pattern structure of a capacitive touch panel in accordance with a second embodiment of the present invention.

In the embodiment discussed previously, the first-axis conductor cells and the second-axis conductor cells are each formed on the substrate in an array form to constitute the conductor pattern structure of the capacitive touch panel. Based on the same philosophy, a small number of conductor cells can also be used to construct a conductor pattern structure of the capacitive touch panel. This is illustrated in FIG. 10 as a second embodiment of the disclosure, wherein two adjacent first-axis conductor cells 31, 32 are formed on a surface 21 of a substrate 2 and a signal transmission line 34 is connected to the conductor cell 32. A first-axis conduction line 33 connects between the adjacent first-axis conductor cells 31, 32. An insulation layer 4 is formed on a surface of the first-axis conduction line 33.

Along an axis that is different from the first-axis conductor cells 31, 32, two adjacent second-axis conductor cells 51, 52 are arranged and a second-axis conduction lines 53 connects between the adjacent second-axis conductor cells 51, 52 by extending over and across a surface of the insulation layer 4. The conductor cell 52 is also connected to a signal transmission line 54.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A conductor pattern structure of a capacitive touch panel formed on a surface of a substrate, the conductor pattern structure comprising:
   a plurality of first-axis conductor assemblies, each first-axis conductor assembly comprising a plurality of first-axis conductor cells arranged on the surface of the substrate along a first axis in a substantially equally-spaced manner, a disposition zone being delimited between adjacent ones of the first-axis conductor assemblies and between adjacent ones of the first-axis conductor cells;
   a plurality of first-axis conduction lines respectively connecting between adjacent ones of the first-axis conductor cells of each first-axis conductor assembly so that the first-axis conductor cells of each respective first-axis conductor assembly are electrically connected together;
   a plurality of insulation layers, each insulation layer of the plurality of insulation layers covering a surface of each first-axis conduction line without encompassing the adjacent first-axis conductor cells;
   a plurality of second-axis conductor assemblies, each second-axis conductor assembly comprising a plurality of second-axis conductor cells arranged on the surface of the substrate along a second axis in a substantially equally-spaced manner, each second-axis conductor cell being set in each disposition zone;
   a plurality of second-axis conduction lines respectively connecting between adjacent ones of the second-axis conductor cells of each second-axis conductor assembly so that the second-axis conductor cells of each respective second-axis conductor assembly are electrically connected together, the second-axis conduction line being extended across a surface of the insulation layer of the respective first-axis conduction line,
   wherein first-axis conductor cells and the second-axis conductor cells consist of a transparent conductive material.

2. The conductor pattern structure as claimed in claim 1, wherein the first-axis conduction lines consist of a transparent conductive material.

3. The conductor pattern structure as claimed in claim 1, wherein the second-axis conduction lines consist of a transparent conductive material.

4. The conductor pattern structure as claimed in claim 1, wherein the insulation layer consists of a transparent insulation material.

5. The conductor pattern structure as claimed in claim 1, wherein the first-axis conductor cells and the second-axis conductor cells have a contour of hexagonal shape.

6. A conductor pattern structure of a capacitive touch panel formed on a surface of a substrate, the conductor pattern structure comprising:
   at least two adjacent first-axis conductor cells; and
   at least two adjacent second-axis conductor cells,
   wherein the adjacent first-axis conductor cells are connected by a first-axis conduction line provided therebetween,
   wherein an insulation layer is formed on a surface of the first-axis conduction line without encompassing the two adjacent first-axis conductor cells, and a second-axis conduction line extends across a surface of the insulation layer to connect between the adjacent second-axis conductor cells, and
   wherein first-axis conductor cells and the second-axis conductor cells consist of a transparent conductive material.

7. The conductor pattern structure as claimed in claim 6, wherein the first-axis conduction lines consist of a transparent conductive material.

8. The conductor pattern structure as claimed in claim 6, wherein the second-axis conduction lines consist of a transparent conductive material.

9. The conductor pattern structure as claimed in claim 6, wherein the insulation layer consists of a transparent insulation material.

10. The conductor pattern structure as claimed in claim 6, wherein the first-axis conductor cells and the second-axis conductor cells have a contour of hexagonal shape.

11. The conductor pattern structure as claimed in claim 1 further comprises a plurality of signal transmission lines formed on the surface of the substrate, each signal transmission line respectively connecting each first-axis conductor assembly and each second-axis conductor assembly.

12. The conductor pattern structure as claimed in claim 11, wherein the first-axis conduction lines consist of a transparent conductive material.

13. The conductor pattern structure as claimed in claim 11, wherein the second-axis conduction lines consist of a transparent conductive material.

14. The conductor pattern structure as claimed in claim 11, wherein the insulation layer consists of a transparent insulation material.

15. The conductor pattern structure as claimed in claim 11, wherein the first-axis conductor cells and the second-axis conductor cells have a contour of hexagonal shape.

16. The conductor pattern structure as claimed in claim 11, wherein the transparent conductive material is Indium Tin Oxide (ITO).

17. A conductor pattern structure of a capacitive touch panel formed on a surface of a substrate, the conductor pattern structure comprising:
  a plurality of first-axis conductor assemblies, each first-axis conductor assembly comprising a plurality of first-axis conductor cells arranged on the surface of the substrate along a first axis in a substantially equally-spaced manner, a disposition zone being delimited between adjacent ones of the first-axis conductor assemblies and between adjacent ones of the first-axis conductor cells;
  a plurality of first-axis conduction lines respectively connecting between adjacent ones of the first-axis conductor cells of each first-axis conductor assembly so that the first-axis conductor cells of each respective first-axis conductor assembly are electrically connected together;
  a plurality of insulation layers, each insulation layer of the plurality of insulation layers covering a surface of each first-axis conduction line without encompassing the adjacent first-axis conductor cells;
  a plurality of second-axis conductor assemblies, each second-axis conductor assembly comprising a plurality of second-axis conductor cells arranged on the surface of the substrate along a second axis in a substantially equally-spaced manner, each second-axis conductor cell being set in each disposition zone;
  a plurality of second-axis conduction lines respectively connecting between adjacent ones of the second-axis conductor cells of each second-axis conductor assembly so that the second-axis conductor cells of each respective second-axis conductor assembly are electrically connected together, the second-axis conduction line being extended across a surface of the insulation layer of the respective first-axis conduction line; and
  a plurality of signal transmission lines formed on the surface of the substrate, each signal transmission line respectively connecting each first-axis conductor assembly and each second-axis conductor assembly,
  wherein first-axis conductor cells and the second-axis conductor cells consist of a transparent conductive material, and
  wherein a capacitance between a first cell of the plurality of first-axis conductor cells and a second cell of the plurality of second-axis conductor cells is measured to detect a position of touch.

18. The conductor pattern structure as claimed in claim 17, wherein the first-axis conduction lines consist of a transparent conductive material.

19. The conductor pattern structure as claimed in claim 17, wherein the second-axis conduction lines consist of a transparent conductive material.

20. The conductor pattern structure as claimed in claim 17, wherein the insulation layer consists of a transparent insulation material.

21. The conductor pattern structure as claimed in claim 17, wherein the first-axis conductor cells and the second-axis conductor cells have a contour of hexagonal shape.

22. The conductor pattern structure as claimed in claim 17, wherein each second-axis conduction line terminates on the edge of each second-axis conductor cell to the adjacent second-axis conductor cells.

23. The conductor pattern structure as claimed in claim 17, wherein the transparent conductive material is Indium Tin Oxide (ITO).

24. The conductor pattern structure as claimed in claim 1, wherein each second-axis conduction line terminates on the edge of each second-axis conductor cell to the adjacent second-axis conductor cells.

25. A conductor pattern structure of a capacitive touch panel formed on a surface of a substrate, the conductor pattern structure comprising:
  a plurality of first-axis conductor assemblies, each first-axis conductor assembly comprising a plurality of first-axis conductor cells arranged on the surface of the substrate along a first axis in a substantially equally-spaced manner, a disposition zone being delimited between adjacent ones of the first-axis conductor assemblies and between adjacent ones of the first-axis conductor cells;
  a plurality of first-axis conduction lines respectively connecting between adjacent ones of the first-axis conductor cells of each first-axis conductor assembly so that the first-axis conductor cells of each respective first-axis conductor assembly are electrically connected together;
  a plurality of insulation layers, each insulation layer of the plurality of insulation layers covering a surface of each first-axis conduction line without encompassing the adjacent first-axis conductor cells;
  a plurality of second-axis conductor assemblies, each second-axis conductor assembly comprising a plurality of second-axis conductor cells arranged on the surface of the substrate along a second axis in a substantially equally-spaced manner, each second-axis conductor cell being set in each disposition zone; and
  a plurality of second-axis conduction lines respectively connecting between adjacent ones of the second-axis conductor cells of each second-axis conductor assembly so that the second-axis conductor cells of each respective second-axis conductor assembly are electrically connected together, the second-axis conduction line being extended across a surface of the insulation layer of the respective first-axis conduction line,
  wherein first-axis conductor cells and the second-axis conductor cells consist of a transparent conductive material, and
  wherein a capacitance between a first cell of the plurality of first-axis conductor cells and a second cell of the plurality of second-axis conductor cells is measured to detect a position of touch.

26. The conductor pattern structure as claimed in claim 25, wherein the first-axis conduction lines consist of a transparent conductive material.

27. The conductor pattern structure as claimed in claim 25, wherein the second-axis conduction lines consist of a transparent conductive material.

28. The conductor pattern structure as claimed in claim 25, wherein the insulation layer consists of a transparent insulation material.

29. The conductor pattern structure as claimed in claim 25, wherein the first-axis conductor cells and the second-axis conductor cells have a contour of hexagonal shape.

30. The conductor pattern structure as claimed in claim 25, wherein the transparent conductive material is Indium Tin Oxide (ITO).

31. The conductor pattern structure as claimed in claim 1, wherein the transparent conductive material is Indium Tin Oxide (ITO).

32. A method of constructing a conductor pattern structure of a capacitive touch panel, the method comprising:
  forming a plurality of first-axis conductor cells on a surface of a substrate arranged along a first axis in a substantially equally-spaced manner, forming a plurality of second-axis conductor cells on the surface of the substrate arranged along a second axis in a substantially equally-spaced manner;

electrically connecting adjacent ones of the first-axis conductor cells along the first-axis using a plurality of first-axis conduction lines to form a plurality of first-axis conductor assemblies, wherein each second-axis conductor cell is set in each disposition zone being delimited between adjacent ones of the first-axis conductor assemblies and between adjacent ones of the first-axis conductor cells;

forming a plurality of insulation layers covering a surface of each first-axis conduction line without encompassing the adjacent first-axis conductor cells; and electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material.

33. The method of claim 32, wherein the first-axis conductor cells, the second-axis conductor cells and the first-axis conduction lines are formed simultaneously.

34. The method of claim 32 further comprising forming a plurality of signal transmission lines on the surface of the substrate, each signal transmission line respectively connecting each first-axis conductor assembly and each second-axis conductor assembly.

35. A method of constructing a conductor pattern structure of a capacitive touch panel, the method comprising:

forming a plurality of first-axis conductor cells on a surface of a substrate arranged along a first axis in a substantially equally-spaced manner;

forming a plurality of second-axis conductor cells on the surface of the substrate arranged along a second axis in a substantially equally-spaced manner;

electrically connecting adjacent ones of the first-axis conductor cells along the first-axis using a plurality of first-axis conduction lines to form a plurality of first-axis conductor assemblies, wherein each second-axis conductor cell is set in each disposition zone being delimited between adjacent ones of the first-axis conductor assemblies and between adjacent ones of the first-axis conductor cells;

forming a plurality of insulation layers covering a surface of each first-axis conduction line without encompassing the adjacent first-axis conductor cells;

electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material; and measuring a capacitance between a first cell of the plurality of first-axis conductor cells and a second cell of the plurality of second-axis conductor cells to detect a position of touch.

36. The method of claim 32, wherein the first-axis conduction lines consist of a transparent conductive material.

37. The method of claim 32, wherein the second-axis conduction lines consist of a transparent conductive material.

38. The method of claim 32, wherein the insulation layer consists of a transparent insulation material.

39. The method of claim 32, wherein the first-axis conductor cells and the second-axis conductor cells have a contour of hexagonal shape.

40. The method of claim 32, wherein each second-axis conduction line terminates on the edge of each second-axis conductor cell to the adjacent second-axis conductor cells.

41. The method of claim 32, wherein the transparent conductive material is Indium Tin Oxide (ITO).

42. A method of constructing a conductor pattern structure of a capacitive touch panel, the method comprising:

forming a plurality of first-axis conductor cells on a surface of a substrate arranged along a first axis in a substantially equally-spaced manner, wherein each first-axis conductor cell is separated by each disposition zone between adjacent ones of the first-axis conductor cells;

electrically connecting adjacent ones of the first-axis conductor cells along the first-axis using a plurality of first-axis conduction lines to form a plurality of first-axis conductor assemblies;

forming a plurality of insulation layers covering a surface of each first-axis conduction line without encompassing the adjacent first-axis conductor cells;

forming a plurality of second-axis conductor cells in each disposition zone between adjacent ones of the first-axis conductor cells on the surface of the substrate arranged along a second axis in a substantially equally-spaced manner; and electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material.

43. The method of claim 42 further comprising forming a plurality of signal transmission lines on the surface of the substrate, each signal transmission line respectively connecting each first-axis conductor assembly and each second-axis conductor assembly.

44. A method of constructing a conductor pattern structure of a capacitive touch panel, the method comprising:

forming a plurality of first-axis conductor cells on a surface of a substrate arranged along a first axis in a substantially equally-spaced manner, wherein each first-axis conductor cell is separated by each disposition zone between adjacent ones of the first-axis conductor cells;

electrically connecting adjacent ones of the first-axis conductor cells along the first-axis using a plurality of first-axis conduction lines to form a plurality of first-axis conductor assemblies;

forming a plurality of insulation layers covering a surface of each first-axis conduction line without encompassing the adjacent first-axis conductor cells;

forming a plurality of second-axis conductor cells in each disposition zone between adjacent ones of the first-axis conductor cells on the surface of the substrate arranged along a second axis in a substantially equally-spaced manner;

electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material; and measuring a capacitance between a first cell of the plurality of first-axis conductor cells and a second cell of the plurality of second-axis conductor cells to detect a position of touch.

45. The method of claim 42, wherein the transparent conductive material is Indium Tin Oxide (ITO).

46. A conductor pattern structure of a capacitive touch panel formed on a surface of a rigid substrate, the conductor pattern structure comprising:
 a plurality of first-axis conductor assemblies, each first-axis conductor assembly comprising a plurality of first-axis conductor cells arranged on the surface of the rigid substrate along a first axis in a substantially equally-spaced manner, a disposition zone being delimited between adjacent ones of the first-axis conductor assemblies and between adjacent ones of the first-axis conductor cells;
 a plurality of first-axis conduction lines respectively connecting between adjacent ones of the first-axis conductor cells of each first-axis conductor assembly so that the first-axis conductor cells of each respective first-axis conductor assembly are electrically connected together;
 a plurality of insulation layers, each insulation layer of the plurality of insulation layers covering a surface of each first-axis conduction line without encompassing the adjacent first-axis conductor cells;
 a plurality of second-axis conductor assemblies, each second-axis conductor assembly comprising a plurality of second-axis conductor cells arranged on the surface of the rigid substrate along a second axis in a substantially equally-spaced manner, each second-axis conductor cell being set in each disposition zone;
 a plurality of second-axis conduction lines respectively connecting between adjacent ones of the second-axis conductor cells of each second-axis conductor assembly so that the second-axis conductor cells of each respective second-axis conductor assembly are electrically connected together, the second-axis conduction line being extended across a surface of the insulation layer of the respective first-axis conduction line,
 wherein first-axis conductor cells and the second-axis conductor cells consist of a transparent conductive material.

47. The conductor pattern structure as claimed in claim 46, wherein the first-axis conduction lines consist of a transparent conductive material.

48. The conductor pattern structure as claimed in claim 46, wherein the second-axis conduction lines consist of a transparent conductive material.

49. The conductor pattern structure as claimed in claim 46, wherein the insulation layer consists of a transparent insulation material.

50. The conductor pattern structure as claimed in claim 46, wherein the first-axis conductor cells and the second-axis conductor cells have a contour of hexagonal shape.

51. The conductor pattern structure as claimed in claim 46 further comprises a plurality of signal transmission lines formed on the surface of the rigid substrate, each signal transmission line respectively connecting each first-axis conductor assembly and each second-axis conductor assembly.

52. The conductor pattern structure as claimed in claim 46, wherein each second-axis conduction line terminates on the edge of each second-axis conductor cell to the adjacent second-axis conductor cells.

53. A conductor pattern structure of a capacitive touch panel formed on a surface of a rigid substrate, the conductor pattern structure comprising:
 at least two adjacent first-axis conductor cells; and
 at least two adjacent second-axis conductor cells,
 wherein the adjacent first-axis conductor cells are connected by a first-axis conduction line provided therebetween,
 wherein an insulation layer is formed on a surface of the first-axis conduction line without encompassing the two adjacent first-axis conductor cells, and a second-axis conduction line extends across a surface of the insulation layer to connect between the adjacent second-axis conductor cells, and
 wherein first-axis conductor cells and the second-axis conductor cells consist of a transparent conductive material.

54. The conductor pattern structure as claimed in claim 53, wherein the first-axis conduction lines consist of a transparent conductive material.

55. The conductor pattern structure as claimed in claim 53, wherein the second-axis conduction lines consist of a transparent conductive material.

56. The conductor pattern structure as claimed in claim 53, wherein the insulation layer consists of a transparent insulation material.

57. The conductor pattern structure as claimed in claim 53, wherein the first-axis conductor cells and the second-axis conductor cells have a contour of hexagonal shape.

58. A method of constructing a conductor pattern structure of a capacitive touch panel, the method comprising:
 forming a plurality of first-axis conductor cells on a surface of a rigid substrate arranged along a first axis in a substantially equally-spaced manner,
 forming a plurality of second-axis conductor cells on the surface of the rigid substrate arranged along a second axis in a substantially equally-spaced manner;
 electrically connecting adjacent ones of the first-axis conductor cells along the first-axis using a plurality of first-axis conduction lines to form a plurality of first-axis conductor assemblies, wherein each second-axis conductor cell is set in each disposition zone being delimited between adjacent ones of the first-axis conductor assemblies and between adjacent ones of the first-axis conductor cells;
 forming a plurality of insulation layers covering a surface of each first-axis conduction line without encompassing the adjacent first-axis conductor cells; and
 electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material.

59. The method of claim 58, wherein the first-axis conductor cells, the second-axis conductor cells and the first-axis conduction lines are formed simultaneously.

60. The method of claim 58 further comprising forming a plurality of signal transmission lines on the surface of the rigid substrate, each signal transmission line respectively connecting each first-axis conductor assembly and each second-axis conductor assembly.

61. The method of claim 58, wherein the first-axis conduction lines consist of a transparent conductive material.

62. The method of claim 58, wherein the second-axis conduction lines consist of a transparent conductive material.

63. The method of claim 58, wherein the insulation layer consists of a transparent insulation material.

64. The method of claim 58, wherein the first-axis conductor cells and the second-axis conductor cells have a contour of hexagonal shape.

65. The method of claim 58, wherein each second-axis conduction line terminates on the edge of each second-axis conductor cell to the adjacent second-axis conductor cells.

66. A method of constructing a conductor pattern structure of a capacitive touch panel, the method comprising:
 forming a plurality of first-axis conductor cells on a surface of a rigid substrate arranged along a first axis in a substantially equally-spaced manner, wherein each first-axis conductor cell is separated by each disposition zone between adjacent ones of the first-axis conductor cells;

electrically connecting adjacent ones of the first-axis conductor cells along the first-axis using a plurality of first-axis conduction lines to form a plurality of first-axis conductor assemblies;

forming a plurality of insulation layers covering a surface of each first-axis conduction line without encompassing the adjacent first-axis conductor cells;

forming a plurality of second-axis conductor cells in each disposition zone between adjacent ones of the first-axis conductor cells on the surface of the rigid substrate arranged along a second axis in a substantially equally-spaced manner; and electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material.

67. The method of claim 66 further comprising forming a plurality of signal transmission lines on the surface of the rigid substrate, each signal transmission line respectively connecting each first-axis conductor assembly and each second-axis conductor assembly.

68. A method of constructing a conductor pattern structure of a capacitive touch panel, the method comprising:

forming a plurality of first-axis conductor cells on a surface of a rigid substrate arranged along a first axis in a substantially equally-spaced manner, wherein each first-axis conductor cell is separated by each disposition zone between adjacent ones of the first-axis conductor cells;

electrically connecting adjacent ones of the first-axis conductor cells along the first-axis using a plurality of first-axis conduction lines to form a plurality of first-axis conductor assemblies;

forming a plurality of insulation layers covering a surface of each first-axis conduction line without encompassing the adjacent first-axis conductor cells;

forming a plurality of second-axis conductor cells in each disposition zone between adjacent ones of the first-axis conductor cells on the surface of the rigid substrate arranged along a second axis in a substantially equally-spaced manner;

electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material; and measuring a capacitance between a first cell of the plurality of first-axis conductor cells and a second cell of the plurality of second-axis conductor cells to detect a position of touch.

* * * * *

US008217902C1

(12) EX PARTE REEXAMINATION CERTIFICATE (10702nd)
United States Patent
Chang et al.

(10) Number: US 8,217,902 C1
(45) Certificate Issued: Sep. 4, 2015

(54) CONDUCTOR PATTERN STRUCTURE OF CAPACITIVE TOUCH PANEL

(75) Inventors: Ching-Yang Chang, Taipei (TW); Shun-Ta Chien, Taipei (TW)

(73) Assignee: TPK TOUCH SOLUTIONS INC., Taipei (TW)

Reexamination Request:
No. 90/012,869, May 17, 2013

Reexamination Certificate for:
Patent No.: 8,217,902
Issued: Jul. 10, 2012
Appl. No.: 11/842,747
Filed: Aug. 21, 2007

(51) Int. Cl.
*G06F 3/041* (2006.01)
*G01R 27/26* (2006.01)
*G09G 5/00* (2006.01)
*G06F 1/16* (2006.01)

(52) U.S. Cl.
CPC .............. *G06F 1/169* (2013.01); *G06F 1/1692* (2013.01)

(58) Field of Classification Search
None
See application file for complete search history.

(56) References Cited

To view the complete listing of prior art documents cited during the proceeding for Reexamination Control Number 90/012,869, please refer to the USPTO's public Patent Application Information Retrieval (PAIR) system under the Display References tab.

*Primary Examiner* — John M Hotaling

(57) ABSTRACT

Disclosed is a conductor pattern structure of a capacitive touch panel. First-axis conductor assemblies and second-axis conductor assemblies are formed on a surface of a substrate. Each first-axis conductor assembly includes a plurality of first-axis conductor cells that are interconnected by first-axis conduction lines. An insulation layer is formed on a surface of each first-axis conduction line. Each second-axis conductor assembly includes a plurality of second-axis conductor cells that are interconnected by second-axis conduction lines. Each second-axis conduction line extends across the insulation layer of the associated first-axis conduction line.

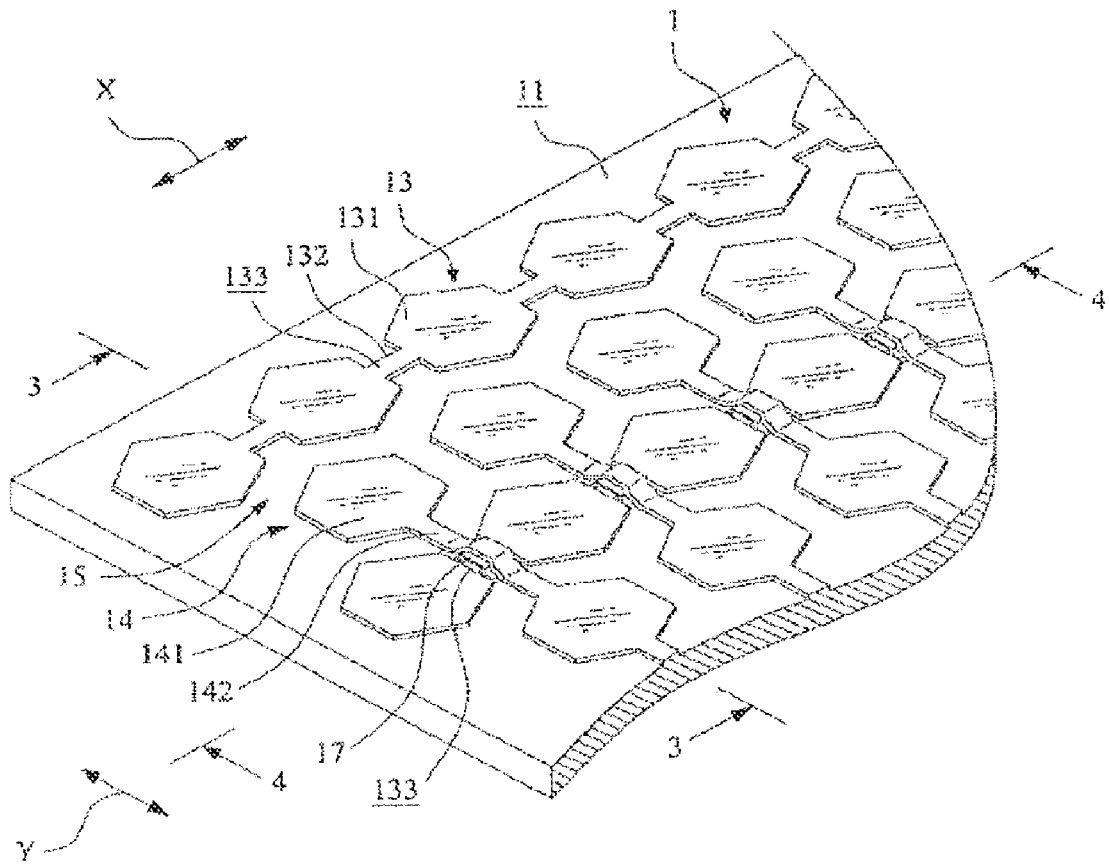

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 17-23, 25-30, 35, 44 and 68 is confirmed.

Claims 1, 6, 32, 42, 46, 53, 58 and 66 are determined to be patentable as amended.

Claims 2-5, 7-16, 24, 31, 33, 34, 36-41, 43, 45, 47-52, 54-57, 59-65 and 67, dependent on an amended claim, are determined to be patentable.

New claims 69-82 are added and determined to be patentable.

1. A conductor pattern structure of a capacitive touch panel formed on a surface of a substrate, the conductor pattern structure comprising:
   a plurality of first-axis conductor assemblies, each first-axis conductor assembly comprising a plurality of first-axis conductor cells arranged on the surface of the substrate along a first axis in a substantially equally-spaced manner, a disposition zone being delimited between adjacent ones of the first-axis conductor assemblies and between adjacent ones of the first-axis conductor cells;
   a plurality of first-axis conduction lines respectively connecting between adjacent ones of the first-axis conductor cells of each first-axis conductor assembly so that the first-axis conductor cells of each respective first-axis conductor assembly are electrically connected together;
   a plurality of insulation layers, each insulation layer of the plurality of insulation layers covering a surface of each first-axis conduction line without encompassing the adjacent first-axis conductor cells;
   a plurality of second-axis conductor assemblies, each second-axis conductor assembly comprising a plurality of second-axis conductor cells arranged on the surface of the substrate along a second axis in a substantially equally-spaced manner, each second-axis conductor cell being set in each disposition zone;
   a plurality of second-axis conduction lines respectively connecting between adjacent ones of the second-axis conductor cells of each second-axis conductor assembly so that the second-axis conductor cells of each respective second-axis conductor assembly are electrically connected together, the second-axis conduction line being extended across a surface of the insulation layer of the respective first-axis conduction line,
   *wherein the first-axis conductor cells and second-axis conductor cells are geometrically shaped in a manner to detect a capacitance variation between adjacent first-axis conductor cells and second-axis conductor cells in response to a touch; and*
   wherein first-axis conductor cells and the second-axis conductor cells consist of a transparent conductive material.

6. A conductor pattern structure of a capacitive touch panel formed on a surface of a substrate, the conductor pattern structure comprising:
   at least two adjacent first-axis conductor cells; and
   at least two adjacent second-axis conductor cells,
   wherein the adjacent first-axis conductor cells are connected by a first-axis conduction line provided therebetween,
   wherein an insulation layer is formed on a surface of the first-axis conduction line without encompassing the two adjacent first-axis conductor cells, and a second-axis conduction line extends across a surface of the insulation layer to connect between the adjacent second-axis conductor cells,
   *wherein a capacitance between a first cell of the adjacent first-axis conductor cells and a second cell of the adjacent second-axis conductor cells is measurable to detect a position of touch; and*
   wherein first-axis conductor cells and the second-axis conductor cells consist of a transparent conductive material.

32. A method of constructing a conductor pattern structure of a capacitive touch panel, the method comprising:
   forming a plurality of first-axis conductor cells on a surface of a substrate arranged along a first axis in a substantially equally-spaced manner, forming a plurality of second-axis conductor cells on the surface of the substrate arranged along a second axis in a substantially equally-spaced manner;
   electrically connecting adjacent ones of the first-axis conductor cells along the first-axis using a plurality of first-axis conduction lines to form a plurality of first-axis conductor assemblies, wherein each second-axis conductor cell is set in each disposition zone being delimited between adjacent ones of the first-axis conductor assemblies and between adjacent ones of the first-axis conductor cells;
   forming a plurality of insulation layers covering a surface of each first-axis conduction line without encompassing the adjacent first-axis conductor cells;
   electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material;
   *wherein the first-axis conductor cells and second-axis conductor cells are geometrically shaped in a manner to detect a capacitance variation between adjacent first-axis conductor cells and second-axis conductor cells in response to a touch.*

42. A method of constructing a conductor pattern structure of a capacitive touch panel, the method comprising:
   forming a plurality of first-axis conductor cells on a surface of a substrate arranged along a first axis in a substantially equally-spaced manner, wherein each first-axis conductor cell is separated by each disposition zone between adjacent ones of the first-axis conductor cells;
   electrically connecting adjacent ones of the first-axis conductor cells along the first-axis using a plurality of first-axis conduction lines to form a plurality of first-axis conductor assemblies;
   forming a plurality of insulation layers covering a surface of each first-axis conduction line without encompassing the adjacent first-axis conductor cells;
   forming a plurality of second-axis conductor cells in each disposition zone between adjacent ones of the first-axis conductor cells on the surface of the substrate arranged along a second axis in a substantially equally-spaced manner; and electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material;

wherein the first-axis conductor cells and second-axis conductor cells are geometrically shaped in a manner to detect a capacitance variation between adjacent first-axis conductor cells and second-axis conductor cells in response to a touch.

46. A conductor pattern structure of a capacitive touch panel formed on a surface of a rigid substrate, the conductor pattern structure comprising:

a plurality of first-axis conductor assemblies, each first-axis conductor assembly comprising a plurality of first-axis conductor cells arranged on the surface of the rigid substrate along a first axis in a substantially equally-spaced manner, a disposition zone being delimited between adjacent ones of the first-axis conductor assemblies and between adjacent ones of the first-axis conductor cells;

a plurality of first-axis conduction lines respectively connecting between adjacent ones of the first-axis conductor cells of each first-axis conductor assembly so that the first-axis conductor cells of each respective first-axis conductor assembly are electrically connected together;

a plurality of insulation layers, each insulation layer of the plurality of insulation layers covering a surface of each first-axis conduction line without encompassing the adjacent first-axis conductor cells;

a plurality of second-axis conductor assemblies, each second-axis conductor assembly comprising a plurality of second-axis conductor cells arranged on the surface of the rigid substrate along a second axis in a substantially equally-spaced manner, each second-axis conductor cell being set in each disposition zone;

a plurality of second-axis conduction lines respectively connecting between adjacent ones of the second-axis conductor cells of each second-axis conductor assembly so that the second-axis conductor cells of each respective second-axis conductor assembly are electrically connected together, the second-axis conduction line being extended across a surface of the insulation layer of the respective first-axis conduction line,

*wherein a capacitance between a first cell of the plurality of first-axis conductor cells and a second cell of the plurality of second-axis conductor cells is measurable to detect a position of touch;* and wherein first-axis conductor cells and the second-axis conductor cells consist of a transparent conductive material.

53. A conductor pattern structure of a capacitive touch panel formed on a surface of a rigid substrate, the conductor pattern structure comprising:

at least two adjacent first-axis conductor cells; and at least two adjacent second-axis conductor cells, wherein the adjacent first-axis conductor cells are connected by a first-axis conduction line provided therebetween, wherein an insulation layer is formed on a surface of the first-axis conduction line without encompassing the two adjacent first-axis conductor cells, and a second-axis conduction line extends across a surface of the insulation layer to connect between the adjacent second-axis conductor cells,

*wherein a capacitance between a first cell of the adjacent first-axis conductor cells and a second cell of the adjacent second-axis conductor cells is measurable to detect a position of touch;* and wherein first-axis conductor cells and the second-axis conductor cells consist of a transparent conductive material.

58. A method of constructing a conductor pattern structure of a capacitive touch panel, the method comprising:

forming a plurality of first-axis conductor cells on a surface of a rigid substrate arranged along a first axis in a substantially equally-spaced manner, forming a plurality of second-axis conductor cells on the surface of the rigid substrate arranged along a second axis in a substantially equally-spaced manner;

electrically connecting adjacent ones of the first-axis conductor cells along the first-axis using a plurality of first-axis conduction lines to form a plurality of first-axis conductor assemblies, wherein each second-axis conductor cell is set in each disposition zone being delimited between adjacent ones of the first-axis conductor assemblies and between adjacent ones of the first-axis conductor cells;

forming a plurality of insulation layers covering a surface of each first-axis conduction line without encompassing the adjacent first-axis conductor cells; and electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material;

*wherein a capacitance between a first cell of the plurality of first-axis conductor cells and a second cell of the plurality of second-axis conductor cells is measurable to detect a position of touch.*

66. A method of constructing a conductor pattern structure of a capacitive touch panel, the method comprising:

forming a plurality of first-axis conductor cells on a surface of a rigid substrate arranged along a first axis in a substantially equally-spaced manner, wherein each first-axis conductor cell is separated by each disposition zone between adjacent ones of the first-axis conductor cells;

electrically connecting adjacent ones of the first-axis conductor cells along the first-axis using a plurality of first-axis conduction lines to form a plurality of first-axis conductor assemblies;

forming a plurality of insulation layers covering a surface of each first-axis conduction line without encompassing the adjacent first-axis conductor cells;

forming a plurality of second-axis conductor cells in each disposition zone between adjacent ones of the first-axis conductor cells on the surface of the rigid substrate arranged along a second axis in a substantially equally-spaced manner; and electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material;

*wherein the first-axis conductor cells and second-axis conductor cells are geometrically shaped in a manner to detect a capacitance variation between adjacent first-axis conductor cells and second-axis conductor cells in response to a touch.*

69. A conductor pattern structure of a capacitive touch panel formed on a surface of a substrate, the conductor pattern structure comprising:
   a plurality of first-axis conductor assemblies, each first-axis conductor assembly comprising a plurality of first-axis conductor cells arranged on the surface of the substrate along a first axis in a substantially equally-spaced manner, a disposition zone being delimited between adjacent ones of the first-axis conductor assemblies and between adjacent ones of the first-axis conductor cells;
   a plurality of first-axis conduction lines respectively connecting between adjacent ones of the first-axis conductor cells of each first-axis conductor assembly so that the first-axis conductor cells of each respective first-axis conductor assembly are electrically connected together;
   a plurality of insulation layers, each insulation layer of the plurality of insulation layers covering a surface of each first-axis conduction line without encompassing the adjacent first-axis conductor cells;
   a plurality of second-axis conductor assemblies, each second-axis conductor assembly comprising a plurality of second-axis conductor cells arranged on the surface of the substrate along a second axis in a substantially equally-spaced manner, each second-axis conductor cell being set in each disposition zone;
   a plurality of second-axis conduction lines respectively connecting between adjacent ones of the second-axis conductor cells of each second-axis conductor assembly so that the second-axis conductor cells of each respective second-axis conductor assembly are electrically connected together, the second-axis conduction line being extended across a surface of the insulation layer of the respective first-axis conduction line;
   a plurality of signal transmission lines formed on the surface of the substrate, each signal transmission line respectively connecting each first-axis conductor assembly and each second-axis conductor assembly; and
   a control circuit electrically connected to the plurality of signal transmission lines for measuring the capacitive effect between a first cell of the plurality of first-axis conductor cells and a second cell of the plurality of second-axis conductor cells to detect a position of touch;
   wherein first-axis conductor cells and the second-axis conductor cells consist of a transparent conductive material.

70. A conductor pattern structure of a capacitive touch panel formed on a surface of a substrate, the conductor pattern structure comprising:
   a plurality of first-axis conductor assemblies, each first-axis conductor assembly comprising a plurality of first-axis conductor cells arranged on the surface of the substrate along a first axis in a substantially equally-spaced manner, a disposition zone being delimited between adjacent ones of the first-axis conductor assemblies and between adjacent ones of the first-axis conductor cells;
   a plurality of first-axis conduction lines respectively connecting between adjacent ones of the first-axis conductor cells of each first-axis conductor assembly so that the first-axis conductor cells of each respective first-axis conductor assembly are electrically connected together;
   a plurality of insulation layers, each insulation layer of the plurality of insulation layers covering a surface of each first-axis conduction line without encompassing the adjacent first-axis conductor cells;
   a plurality of second-axis conductor assemblies, each second-axis conductor assembly comprising a plurality of second-axis conductor cells arranged on the surface of the substrate along a second axis in a substantially equally-spaced manner, each second-axis conductor cell being set in each disposition zone;
   a plurality of second-axis conduction lines respectively connecting between adjacent ones of the second-axis conductor cells of each second-axis conductor assembly so that the second-axis conductor cells of each respective second-axis conductor assembly are electrically connected together, the second-axis conduction line being extended across a surface of the insulation layer of the respective first-axis conduction line; and
   a control circuit electrically coupled to the pluralities of conductor assemblies for measuring the capacitive effect between a first cell of the plurality of first-axis conductor cells and a second cell of the plurality of second-axis conductor cells to detect a position of touch;
   wherein first-axis conductor cells and the second-axis conductor cells consist of a transparent conductive material.

71. A method of constructing a conductor pattern structure of a capacitive touch panel, the method comprising:
   forming a plurality of first-axis conductor cells on a surface of a substrate arranged along a first axis in a substantially equally-spaced manner;
   forming a plurality of second-axis conductor cells on the surface of the substrate arranged along a second axis in a substantially equally-spaced manner;
   electrically connecting adjacent ones of the first-axis conductor cells along the first-axis using a plurality of first-axis conduction lines to form a plurality of first-axis conductor assemblies, wherein each second-axis conductor cell is set in each disposition zone being delimited between adjacent ones of the first-axis conductor assemblies and between adjacent ones of the first-axis conductor cells;
   forming a plurality of insulation layers covering a surface of each first-axis conduction line without encompassing the adjacent first-axis conductor cells;
   electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material; and
   electrically coupling the pluralities of conductor assemblies to a control circuit operable to measure the capacitance between a first cell of the plurality of first-axis conductor cells and a second cell of the plurality of second-axis conductor cells to detect a position of touch.

72. A method of constructing a conductor pattern structure of a capacitive touch panel, the method comprising:
   forming a plurality of first-axis conductor cells on a surface of a substrate arranged along a first axis in a substantially equally-spaced manner, wherein each first-axis conductor cell is separated by each disposition zone between adjacent ones of the first-axis conductor cells;
   electrically connecting adjacent ones of the first-axis conductor cells along the first-axis using a plurality of first-axis conduction lines to form a plurality of first-axis conductor assemblies;

forming a plurality of insulation layers covering a surface of each first-axis conduction line without encompassing the adjacent first-axis conductor cells;

forming a plurality of second-axis conductor cells in each disposition zone between adjacent ones of the first-axis conductor cells on the surface of the substrate arranged along a second axis in a substantially equally-spaced manner;

electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material; and electrically coupling the pluralities of conductor assemblies to a control circuit operable to measure the capacitance between a first cell of the plurality of first-axis conductor cells and a second cell of the plurality of second-axis conductor cells to detect a position of touch.

73. A method of constructing a conductor pattern structure of a capacitive touch panel, the method comprising:

forming a plurality of first-axis conductor cells on a surface of a rigid substrate arranged along a first axis in a substantially equally-spaced manner, wherein each first-axis conductor cell is separated by each disposition zone between adjacent ones of the first-axis conductor cells;

electrically connecting adjacent ones of the first-axis conductor cells along the first-axis using a plurality of first-axis conduction lines to form a plurality of first-axis conductor assemblies;

forming a plurality of insulation layers covering a surface of each first-axis conduction line without encompassing the adjacent first-axis conductor cells;

forming a plurality of second-axis conductor cells in each disposition zone between adjacent ones of the first-axis conductor cells on the surface of the rigid substrate arranged along a second axis in a substantially equally-spaced manner;

electrically connecting adjacent ones of the second-axis conductor cells along the second-axis using a plurality of second-axis conduction lines to form a plurality of second-axis conductor assemblies, each of the first-axis conductor cells and the second-axis conductor cells consisting of a transparent conductive material; and electrically coupling the pluralities of conductor assemblies to a control circuit operable to measure the capacitance between a first cell of the plurality of first-axis conductor cells and a second cell of the plurality of second-axis conductor cells to detect a position of touch.

74. A conductor pattern structure of a capacitive touch panel formed on a surface of a substrate, the conductor pattern structure comprising:

a plurality of first-axis conductor assemblies, each first-axis conductor assembly comprising a plurality of first-axis conductor cells arranged on the surface of the substrate along a first axis in a substantially equally-spaced manner, a disposition zone being delimited between adjacent ones of the first-axis conductor assemblies and between adjacent ones of the first-axis conductor cells;

a plurality of first-axis conduction lines respectively connecting between adjacent ones of the first-axis conductor cells of each first-axis conductor assembly so that the first-axis conductor cells of each respective first-axis conductor assembly are electrically connected together;

a plurality of insulation layers, each insulation layer of the plurality of insulation layers covering a surface of each first-axis conduction line without encompassing the adjacent first-axis conductor cells;

a plurality of second-axis conductor assemblies, each second-axis conductor assembly comprising a plurality of second-axis conductor cells arranged on the surface of the substrate along a second axis in a substantially equally-spaced manner, each second-axis conductor cell being set in each disposition zone;

a plurality of second-axis conduction lines respectively connecting between adjacent ones of the second-axis conductor cells of each second-axis conductor assembly so that the second-axis conductor cells of each respective second-axis conductor assembly are electrically connected together, the second-axis conduction line being extended across a surface of the insulation layer of the respective first-axis conduction line; and a plurality of signal transmission lines formed on the surface of the substrate, each signal transmission line respectively connecting each first-axis conductor assembly and each second-axis conductor assembly;

wherein the conductive pattern structure is configured to produce a capacitance between a first cell of the plurality of first-axis conductor cells and a second cell of the plurality of second axis conductor cells when connected to a control circuit, such that a variation in said capacitance enables the detection of a touch location.

75. A conductor pattern structure of a capacitive touch panel formed on a surface of a substrate, the conductor pattern structure comprising:

a plurality of first-axis conductor assemblies, each first-axis conductor assembly comprising a plurality of first-axis conductor cells arranged on the surface of the substrate along a first axis in a substantially equally-spaced manner, a disposition zone being delimited between adjacent ones of the first-axis conductor assemblies and between adjacent ones of the first-axis conductor cells;

a plurality of first-axis conduction lines respectively connecting between adjacent ones of the first-axis conductor cells of each first-axis conductor assembly so that the first-axis conductor cells of each respective first-axis conductor assembly are electrically connected together;

a plurality of insulation layers, each insulation layer of the plurality of insulation layers covering a surface of each first-axis conduction line without encompassing the adjacent first-axis conductor cells;

a plurality of second-axis conductor assemblies, each second-axis conductor assembly comprising a plurality of second-axis conductor cells arranged on the surface of the substrate along a second axis in a substantially equally-spaced manner, each second-axis conductor cell being set in each disposition zone; and a plurality of second-axis conduction lines respectively connecting between adjacent ones of the second-axis conductor cells of each second-axis conductor assembly so that the second-axis conductor cells of each respective second-axis conductor assembly are electrically connected together, the second-axis conduction line being extended across a surface of the insulation layer of the respective first-axis conduction line;

wherein the conductive pattern structure is configured to produce a capacitance between a first cell of the plurality of first-axis conductor cells and a second cell of the plurality of second axis conductor cells when connected to a control circuit, such that a variation in said capacitance enables the detection of a touch location.

76. The conductor pattern structure as claimed in claim 1, wherein the manner in which the first-axis and second-axis conductor cells are geometrically shaped optimizes a capacitive effect between the adjacent first-axis and second-axis conductor cells to detect the capacitance variation in response to the touch.

77. The conductor pattern structure as claimed in claim 6, wherein the first-axis and second-axis conductor cells are geometrically shaped in a manner that optimizes a capacitive effect between adjacent first-axis conductor cells and second-axis conductor cells to detect the position of touch.

78. The method as claimed in claim 32, wherein the manner in which the first-axis and second-axis conductor cells are geometrically shaped optimizes a capacitive effect between the adjacent first-axis conductor cells and second-axis conductor cells to detect the capacitance variation in response to the touch.

79. The method as claimed in claim 42, wherein the manner in which the first-axis and second-axis conductor cells are geometrically shaped optimizes a capacitive effect between the adjacent first-axis conductor cells and second-axis conductor cells to detect the capacitance variation in response to the touch.

80. The conductor pattern structure as claimed in claim 53, wherein the first-axis and second-axis conductor cells are geometrically shaped in a manner that optimizes a capacitive effect between adjacent first-axis conductor cells and second-axis conductor cells to detect the position of touch.

81. The method as claimed in claim 58, wherein the first-axis and second-axis conductor cells are geometrically shaped in a manner that optimizes a capacitive effect between adjacent first-axis conductor cells and second-axis conductor cells to detect the position of touch.

82. The method as claimed in claim 66, wherein the manner in which the first-axis and second-axis conductor cells are geometrically shaped optimizes a capacitive effect between the adjacent first-axis conductor cells and second-axis conductor cells to detect the capacitance variation in response to the touch.

* * * * *